United States Patent [19]
Burgess

[11] Patent Number: 6,078,660
[45] Date of Patent: Jun. 20, 2000

[54] METHOD AND DEVICE FOR DECODING A SEQUENCE OF SIGNALS

[75] Inventor: Scott Burgess, Lake Worth, Fla.

[73] Assignee: Siemens Information and Communication Systems, Inc., Boca Raton, Fla.

[21] Appl. No.: 08/720,124

[22] Filed: Sep. 27, 1996

[51] Int. Cl.[7] .................................................. H04M 1/00

[52] U.S. Cl. ........................................ 379/386; 379/93.27

[58] Field of Search .............................. 379/93.26, 93.27, 379/386

[56] References Cited

U.S. PATENT DOCUMENTS 4,843,620  6/1989  Hagedorn ................................. 379/21
5,422,945  6/1995  Wyatt ................................. 379/386 X Primary Examiner—Creighton Smith
Attorney, Agent, or Firm—Joseph S. Codispoti

[57] ABSTRACT

A method and device for decoding a sequence of signals in which information is derived, in part, from a duration of (a) one of the signals and/or (b) an inter-signal pause between two of the signals. The method and device may also be used to decode a signal to form decoded information, derived, in part, from a duration of the signal.

4 Claims, 12 Drawing Sheets

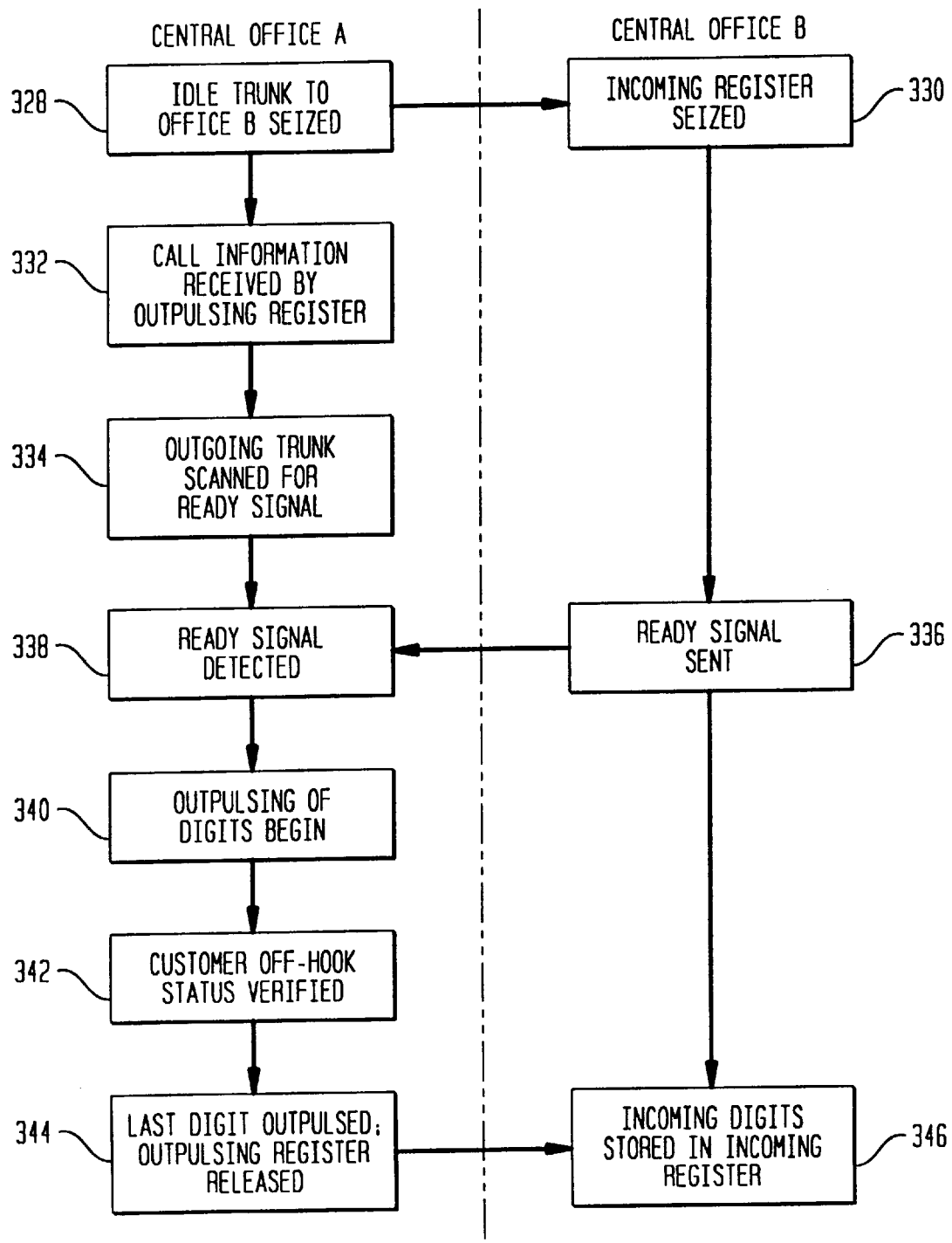

FIG. 5
(PRIOR ART)

| DIGIT | LOW FREQUENCY | HIGH FREQUENCY | HEX OUTPUT | BINARY OUTPUT |
|---|---|---|---|---|
| 1 | 697 Hz | 1209 Hz | 0001 | 0000 |
| 2 | 697 Hz | 1336 Hz | 0010 | 0001 |
| 3 | 697 Hz | 1477 Hz | 0011 | 0010 |
| 4 | 770 Hz | 1209 Hz | 0100 | 0011 |
| 5 | 770 Hz | 1336 Hz | 0101 | 0100 |
| 6 | 770 Hz | 1477 Hz | 0110 | 0101 |
| 7 | 852 Hz | 1209 Hz | 0111 | 0110 |
| 8 | 852 Hz | 1336 Hz | 1000 | 0111 |
| 9 | 852 Hz | 1477 Hz | 1001 | 1000 |
| 0 | 941 Hz | 1209 Hz | 1010 | 1001 |
| * | 941 Hz | 1336 Hz | 1011 | 1010 |
| # | 941 Hz | 1477 Hz | 1100 | 1011 |
| A' | 697 Hz | 1633 Hz | 1101 | 1100 |
| B' | 770 Hz | 1633 Hz | 1110 | 1101 |
| C' | 852 Hz | 1633 Hz | 1111 | 1110 |
| D' | 941 Hz | 1633 Hz | 0000 | 1111 |

FIG. 7

| DIGIT SEQUENCE | POSSIBLE STATES |
|---|---|
| 6 NORMAL DIGITS AND 1 (30) STATE DURATION DEPENDENT DIGIT | $10^6 * 30^1 = 30,000,000$ |
| 5 NORMAL DIGITS AND 2 (30) STATE DURATION DEPENDENT DIGITS | $10^5 * 30^2 = 90,000,000$ |
| 4 NORMAL DIGITS AND 3 (30) STATE DURATION DEPENDENT DIGITS | $10^4 * 30^3 = 270,000,000$ |
| 3 NORMAL DIGITS AND 4 (30) STATE DURATION DEPENDENT DIGITS | $10^3 * 30^4 = 810,000,000$ |
| 2 NORMAL DIGITS AND 5 (30) STATE DURATION DEPENDENT DIGITS | $10^2 * 30^5 = 2,430,000,000$ |
| 1 NORMAL DIGIT AND 6 (30) STATE DURATION DEPENDENT DIGITS | $10^1 * 30^6 = 7,290,000,000$ |
| 7 (30) STATE DURATION DEPENDENT DIGITS | $10^0 * 30^7 = 21,870,000,000$ |

FIG. 8

| DIGIT SEQUENCE | POSSIBLE STATES |
|---|---|
| 6 NORMAL DIGITS AND 1 (20) STATE DURATION DEPENDENT DIGIT | $10^6 * 20^1 = 20,000,000$ |
| 5 NORMAL DIGITS AND 2 (20) STATE DURATION DEPENDENT DIGITS | $10^5 * 20^2 = 40,000,000$ |
| 4 NORMAL DIGITS AND 3 (20) STATE DURATION DEPENDENT DIGITS | $10^4 * 20^3 = 80,000,000$ |
| 3 NORMAL DIGITS AND 4 (20) STATE DURATION DEPENDENT DIGITS | $10^3 * 20^4 = 160,000,000$ |
| 2 NORMAL DIGITS AND 5 (20) STATE DURATION DEPENDENT DIGITS | $10^2 * 20^5 = 320,000,000$ |
| 1 NORMAL DIGIT AND 6 (20) STATE DURATION DEPENDENT DIGITS | $10^1 * 20^6 = 640,000,000$ |
| 7 (20) STATE DURATION DEPENDENT DIGITS | $10^0 * 20^7 = 1,280,000,000$ |

FIG. 10
(PRIOR ART)

| TWO DIGIT ENTRY | LETTER |
|---|---|
| 21 | A |
| 22 | B |
| 23 | C |
| 31 | D |
| 32 | E |
| 33 | F |
| 41 | G |
| 42 | H |
| 43 | I |
| 51 | J |
| 52 | K |
| 53 | L |
| 61 | M |
| 62 | N |
| 63 | O |
| 71 | P |
| 11 | Q |
| 72 | R |
| 73 | S |
| 81 | T |
| 82 | U |
| 83 | V |
| 91 | W |
| 92 | X |
| 93 | Y |
| 12 | Z |

FIG. 11
(PRIOR ART)

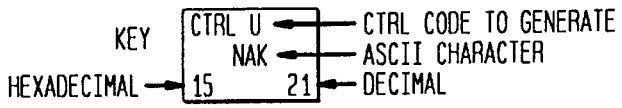

KEY: CTRL U → CTRL CODE TO GENERATE; NAK → ASCII CHARACTER; HEXADECIMAL → 15, 21 ← DECIMAL

| CONTROL | | NUMBERS SYMBOLS | | UPPER CASE | | LOWER CASE | |
|---|---|---|---|---|---|---|---|
| CTRL 0 NUL 00 — 0 | CTRL P DLE 10 — 16 | SP 20 — 32 | 0 30 — 48 | @ 40 — 64 | P 50 — 80 | ` 60 — 96 | p 70 — 112 |
| CTRL A SOH 01 — 1 | CTRL Q DC1 11 — 17 | ! 21 — 33 | 1 31 — 49 | A 41 — 65 | Q 51 — 81 | a 61 — 97 | q 71 — 113 |
| CTRL B STX 02 — 2 | CTRL R DC2 12 — 18 | " 22 — 34 | 2 32 — 50 | B 42 — 66 | R 52 — 82 | b 62 — 98 | r 72 — 114 |
| CTRL C ETX 03 — 3 | CTRL S DC3 13 — 19 | # 23 — 35 | 3 33 — 51 | C 43 — 67 | S 53 — 83 | c 63 — 99 | s 73 — 115 |
| CTRL D EOT 04 — 4 | CTRL T DC4 14 — 20 | $ 24 — 36 | 4 34 — 52 | D 44 — 68 | T 54 — 84 | d 64 — 100 | t 74 — 116 |
| CTRL E ENQ 05 — 5 | CTRL U NAK 15 — 21 | % 25 — 37 | 5 35 — 53 | E 45 — 69 | U 55 — 85 | e 65 — 101 | u 75 — 117 |
| CTRL F ACK 06 — 6 | CTRL V SYN 16 — 22 | & 26 — 38 | 6 36 — 54 | F 46 — 70 | V 56 — 86 | f 66 — 102 | v 76 — 118 |
| CTRL G BEL 07 — 7 | CTRL W ETB 17 — 23 | ' 27 — 39 | 7 37 — 55 | G 47 — 71 | W 57 — 87 | g 67 — 103 | w 77 — 119 |
| CTRL H BS 08 — 8 | CTRL X CAN 18 — 24 | ( 28 — 40 | 8 38 — 56 | H 48 — 72 | X 58 — 88 | h 68 — 104 | x 78 — 120 |
| CTRL I HT 09 — 9 | CTRL Y EM 19 — 25 | ) 29 — 41 | 9 39 — 57 | I 49 — 73 | Y 59 — 89 | i 69 — 105 | y 79 — 121 |
| CTRL J LF 0A — 10 | CTRL Z SUB 1A — 26 | * 2A — 42 | : 3A — 58 | J 4A — 74 | Z 5A — 90 | j 6A — 106 | z 7A — 122 |
| CTRL K VT 0B — 11 | CTRL [ ESC 1B — 27 | + 2B — 43 | ; 3B — 59 | K 4B — 75 | [ 5B — 91 | k 6B — 107 | { 7B — 123 |
| CTRL L FF 0C — 12 | CTRL \ FS 1C — 28 | , 2C — 44 | < 3C — 60 | L 4C — 76 | \ 5C — 92 | l 6C — 108 | | 7C — 124 |
| CTRL M CR 0D — 13 | CTRL ] GS 1D — 29 | - 2D — 45 | = 3D — 61 | M 4D — 77 | ] 5D — 93 | m 6D — 109 | } 7D — 125 |
| CTRL N SO 0E — 14 | CTRL ^ RS 1E — 30 | . 2E — 46 | > 3E — 62 | N 4E — 78 | ^ 5E — 94 | n 6E — 110 | ~ 7E — 126 |
| CTRL O SI 0F — 15 | CTRL _ US 1F — 31 | / 2F — 47 | ? 3F — 63 | O 4F — 79 | _ 5F — 95 | o 6F — 111 | RUBOUT (DEL) 7F — 127 | ns
METHOD AND DEVICE FOR DECODING A SEQUENCE OF SIGNALS

FIELD OF THE INVENTION

The present invention relates to the decoding of a sequence of signals. In particular, the present invention relates to the communication of signaling information, such as dual tone multiple frequency (or "DTMF") signals, across a telecommunications network, for example, the public switched telephone network, and the receipt and decoding (or interpretation) of such signaling information.

BACKGROUND OF THE INVENTION

In telecommunications systems, signaling performs three basic functions; namely (1) supervising functions, (2) alerting functions, and (3) addressing functions. Signaling for supervising functions is used to monitor the status of a transmission line or circuit to determine the state of the line or circuit (i.e., whether it is busy, idle, requesting service, etc.). Voltage levels, tone or data bits for example, are used for supervising function signals. Signaling for alerting functions is used, for example, to indicate the arrival of an incoming call with e.g., bells, buzzers, tones, strobes, lights, etc. Signaling for addressing functions is used to route signals over the network with, for example, dial pulses, tone pulses, and data packets.

Today, most signaling is carried out "in-band" (i.e., it goes along with voice conversations, and occupies the same circuits as those which carry voice conversations). Such in-band signaling is usually carried out with multi-frequency or single frequency signals. Unfortunately, many toll calls are not completed because the called telephone (or other equipment) does not pick up or is busy. Consequently, the circuit time used in signaling, which is substantial and expensive, becomes wasteful. Out-of-band signaling (such as signaling system 7, or "SS7") uses circuit(s) separate from voice circuits for signaling functions.

Although one skilled in the art understands the station equipment and transmission facilities used by Regional Bell Operating Companies (or "RBOCs"), a brief overview of such station equipment and transmission facilities is provided below for the reader's convenience.

FIG. 1 illustrates the use of transmission facilities by various types of services. As shown in FIG. 1, a number of geographically remote central switching offices 120 are coupled via "trunks" 114 and interoffice transmission facilities 118. Various entities, such as residences 102, businesses 104, and private branch exchanges (or "PBXs") 106 are coupled with a central switching office 120 via "lines" 110, 112 and "loop transmission facilities" 108.

Thus, a loop transmission facility (or "subscriber loop") 108 connects telecommunication equipment at a customer premises (e.g., a residence, business, etc.) with an associated central switching office 120. The loop transmission facility 108 is typically on the order of a few miles and usually includes paired copper wire. Interoffice transmission facilities 118, or trunks, connect different central switching offices 120. Interoffice transmission facilities 118 range from less than one mile to thousands of miles.

FIG. 2 is a block diagram showing the connection of two pieces of terminal equipment at customer premises served by separate central offices. Terminal equipment X 202 (such as a telephone or modem for example) is coupled with central office A 206, via loop 208. Similarly, terminal equipment Y 204 is coupled with central office B 210, via loop 212. Central office A 206 is coupled with central office B 210 via trunk lines 214. If all of the trunk lines 214 are busy, central offices A and B, 206 and 210, respectively, may be coupled via trunks 216 and 220 and tandem office C 218.

The flow diagram of FIGS. 3a through 3d illustrates steps involved with initiating a call from terminal equipment X 202 to terminal equipment Y 204, processing the call, and terminating the call, in a system using "in-band" signaling. For the purposes of the following discussion, it will be assumed that the terminal equipment X 202 and Y 204 are telephones. However, the terminal equipment X 202 and Y 204 may be other types of equipment, such as a modem for example.

FIG. 3a shows actions taken at the telephone X 202 and the central office A 206 in initiating the call. First, as shown step 302, when the handset of telephone 202 is lifted, it sends an off-hook signal to the central office A 206 via loop 208. At central office A 206, a change from on-hook to off-hook status is detected. More specifically, when the telephone X 202 is taken off-hook, a circuit is established and the central office A 206 detects a DC current flowing through the established circuit. As shown in step 304, this change in status is interpreted as a request for service. Next, as shown in step 306 assuming that an originating register is available to accept and store the digits to be dialed by telephone X 202, the central office A 206 connects a dial tone signal to the telephone X 202 via loop 208. Line side equipment, such as an analog line unit (or "ALU") or an integrated digital carrier unit (or "IDCU") for example, provides the dial tone signal. As shown in step 308 a number is then dialed at telephone X 202. In response, as shown in steps 310 and 312, once the first digit of the number is recognized, the dial tone is disconnected and the numbers are stored in the originating register.

FIG. 3b shows actions taken at the central office A 206 in processing the call. First, as shown in step 314, control equipment at central office A 206 translates the dialed number. The control equipment performs this translation with a dual tone multiple frequency decoder (or DTMF) receiver which is discussed in more detail below. As shown in step 316, by examining the leading digits (e.g., the first three digits) of the dialed number, the control equipment determines whether the call is to another central office (i.e., an "inter-office" call) or to a subscriber serviced by the same central office (i.e., an intra-office call). In this example, it is assumed that the call is to telephone Y 204 which is served by a separate central office; namely, central office B 210. Next, as shown in step 318, routing information stored in the system indicates which paths (or "trunk groups") are appropriate and translates the desired paths to representations of physical locations of terminations of the trunks. As shown in step 320, if the call is billable, an automatic message accounting (or "AMA") register is requested to enable the telephone service provider to bill the appropriate parties. Next, as shown in step 322, the call information is transferred to an outpulsing register and the originating register is released. Then, as shown in step 324, the control equipment at central office A 206 begins scanning outgoing trunks to find an idle trunk to central office B 210.

If an idle trunk is found, as indicated in step 326, the call be transmitted directly from central office A 206 to central office B 210 via a free trunk 214. If, on the other hand, all trunks 214 from central office A 206 to central office B 210 are busy, then outgoing trunks 216 to tandem switching office C 218 are scanned such that the call may be routed from central office A 206 to central office B 210 via tandem switching office C 218.

FIG. 3c illustrates the actions taken to advance the call to the terminating central office; namely central office B 210. First, as shown in step 328, the idle trunk found in step 326 is seized. In response, as shown in steps 330 and 336, at central office B 210, an incoming register of a switch is seized and control equipment sends a ready signal back to central office A to indicate that the seized incoming register is ready to receive address information. In the meantime, as shown in step 332, at central office A 206, the line of telephone X 202 is connected, via the loop 208 and a switching network within central office A 206, to the seized trunk. In addition, as shown in step 334, control equipment at central office A 206 scans the outgoing trunk for the ready signal.

As shown in steps 338 and 340, when the ready signal sent by central office B 210 is received and detected by central office A 206, the call information is communicated from the outpulsing register of central office A to the seized incoming register of central office B 210. Next, as shown in step 342, before the last digit of the dialed number is sent, the control equipment at central office A 206 checks to see if telephone X 202 is still off-hook. If telephone X 202 is on-hook, the call is abandoned and the control equipment at central office A will terminate the call processing sequence and release associated equipment and circuits (e.g., seized registers, trunks, etc.). If, on the other hand, telephone X 202 is still off-hook, as shown in steps 344 and 346, the last digit of the dialed number is transmitted from the outpulsing register of central office A 206 to the incoming register at central office B 210 and the outpulsing register of central office A 206 is released.

FIG. 3d illustrates the actions taken to complete the call. First, as shown in step 350, the digits of the called number stored in the incoming register of the central office B 210 are translated to a physical location of the termination of the loop 212 of telephone Y 204 at central office B 210. Next, as shown in step 352, the status of the loop 212 of telephone Y 204 is checked to determine whether it is idle or busy. If the loop 212 is busy (i.e., telephone Y 204 is off-hook), a busy signal is returned to telephone X 202 via the switching network of central office B 210, trunk 214, the switching network of central office A 206, and loop 208. However, for purposes of this example, it is assumed that the loop 212 of the telephone Y 204 is idle (i.e., telephone Y is on-hook). In such a case, the incoming trunk 214 is coupled with the loop 212 of telephone Y 204 via the switching network of central office B 210. Next, as shown in steps 356, 358, and 360, a ringing register in central office B 210 is seized, the incoming register which stored the dialed number is released, and a ring signal is enabled. The ring is generated by the control equipment. As shown in steps 362 and 364, the ring signal causes an audible ring to be transmitted to telephone X 202 (via the switching network of central office B 210, trunk 214, the switching network of central office A 206, and loop 208) and causes telephone Y 204 to ring (via loop 212). Control equipment at central office B 210 monitors the status of the telephone Y 204. If the handset of the telephone Y 204 is taken off-hook (see step 366) the ringing signal is disabled. The conversation then begins. Further, as shown in step 368, answer supervision, used to record answer or connect time for billable calls, is provided by control equipment at central office A 206.

As shown in step 370, control equipment at central office A 206 monitors the outgoing trunk 214 for disconnect. The call is terminated if either telephone X 202 or telephone Y 204 is hung up, i.e., if its handset is placed on-hook. If the calling party, i.e., telephone X 202, hangs up first, the connection is released (see step 374), and disconnect supervision is sent to central office B 210. The trunk is then idled when central office B returns on-hook supervision. If, on the other hand, the called party, i.e., telephone Y 204, hangs up first, a timed release period of 10 to 11 seconds is initiated. Finally, as shown in steps 372 and 374, upon the expiration of this timed release period, the connection is released.

The above example describes an inter-office call. An intra-office call is handled similarly except that an idle trunk line is not needed. Basically, for intra-office calls, steps 314, 316, 318, 320, 322, 324, 326, 328, 330, 332, 334, 336, 338, 342, 344, and 346 are not performed. Moreover, steps 350, 352, 354, 356, 358, 360, 364, 366, and 372 are all performed at central office A.

To reiterate, the above described flow diagram of FIGS. 36a through 36d illustrates the steps involved with initiating a call from terminal equipment X 202 to terminal equipment Y 204, processing the call, and terminating the call, in a system using "in-band" signaling. Many present day inter-office networks now use out-of-band signaling such as SS7 signaling to "set up" (or establish) and "tear down" (or terminate) a call. SS7 is used to send messages between remote switching equipment. SS7 is advantageous because it uses separate circuits for signaling and voice data. To reiterate, in the previous systems, the same circuit was used for both signaling and voice data. Such previous systems were disadvantageous because if a circuit was being used for signaling, it could not be used for voice. On the other hand, with SS7, voice trunks are only used when a connection is established.

FIG. 4 illustrates the process of setting up (or establishing) a call 400 in a communications system using SS7. First, as shown in step 402, a caller goes off-hook. Again, the off-hook status of the loop is assumed by the central office based on a DC current through the loop, and the central office returns a dial tone signal to the caller. Next, as shown in step 404, the caller dials digits which causes pulses or DTMF signals to be sent to the central office.

For the purposes of describing the present invention, it will be assumed that the dialed digits will be represented by DTMF signals. As shown in FIG. 5, Each of the digits 0 through 9, as well as the star "*" the an the pound sign "#", are represented by a pairing of one of four (4) low frequencies (697, 770, 852, or 941 Hz) with one of three (3) high frequencies (1209, 1336, or 1477 Hz). Since such signaling is "in-band", and since the frequencies are within the range of human voice, the digits are represented by a paired low and high frequency to avoid having the human voice inadvertently imitating or "falsing" one of the DTMF signals. The amplitudes of the low frequency and high frequency components of the dual tone are also compared with a threshold(s) and each other, to further reduce the chance of falsing.

Next, as shown in step 406, the dialed digits are received and decoded by equipment at the central office. Such equipment may include a standard DTMF decoder such as a model M-8870 DTMF Receiver sold by Teltone. Typically, a DTMF receiver will convert valid dual tones—i.e., dual tones that: (i) meet a minimum amplitude requirement; (ii) meet a minimum duration requirement (e.g., 18 ms); and (iii) have a minimum interdigit pause (e.g., 18 ms). However, the amplitude, duration and interdigit pauses are not themselves interpreted as carrying any information—they are only used to determine whether or not a signal is valid.

Next, as shown in step 408, if available, a signaling trunk to the destination office is seized based on a routing table and the decoded dialed digits. As shown in steps 410, 412, and 414, if the dialed equipment is off-hook (i.e., if the line is busy), (i) the destination office signals the central office that the line is busy and (ii) the central office provides busy signal tones to the caller. On the other hand, as shown in steps 410, 416, and 418, if the dialed equipment is not off-hook, (i) the destination office provides ring to the called equipment, (ii) the destination office signals the central office that the line is free, and (iii) the central office provides a ring signal to the caller.

Next, as shown in steps 420 and 422, if the called equipment has gone off-hook, i.e., if the called equipment answers the ring, a connection is established; that is, a voice circuit is seized. If, on the other hand, the called equipment has not gone off-hook, the ringing continues until the attempted call is terminated (not shown) or until the called equipment goes off-hook.

The limited ways of interpreting the twelve dual tone signals limits the information which can be conveyed by a sequence of fixed size (e.g., seven (7) dual tones or ten (10) dual tones). This inherently causes a number of problems, some of which may be classified as line distinction problems, and some of which may be classified as convenience problems.

Regarding the line distinction type problems, as the number of lines used continues to increasing, due to, for example, the increasing prevalence of facsimile machines, modems, home office lines, pagers, etc., area codes are being reformatted. This is disadvantageous because people must remember new area codes and private equipment must be reconfigured to work with the new area codes. For example, some private equipment cannot handle new three (3) digit office codes of the format NNX, where N is a number from 2 to 9 and X is a number from 0 to 9. Such private equipment can only recognize three (3) digit office codes of the format XZX, were Z is either 0 or 1. A similar problem has happened with the limited number of toll-free "800" numbers—now, "888" is also being used for toll-free numbers. some private equipment will not recognize ▒888▒ as a toll-free number.

Regarding the convenience problems, as the use of facsimile machines, e-mail, modems, pagers, etc. continues to increase, it will become increasingly difficult for people to remember and recall all of those numbers. Although automated touch tone menuing and call forwarding systems have alleviated this problem somewhat, such systems are relatively expensive and require set up time by each end user. Another convenience problem concerns the use of dual tones to enter a security code. On the one hand, if the number of digits entered is too small, the security code would not offer much security and unauthorized access will be made easier. On the other hand, if the number of digits entered is too large, the security code will be difficult to remember thereby possibly preventing authorized people from access or causing authorized people to write down their security number, which may then be lost, copied or stolen. Finally, certain services, such as TeleBroker▒ by Charles Schwab & Co., Inc., require users to "type" letters with their telephone keypad. To "type" a letter, (i) the keypad number to which the letter is assigned is pressed, and (ii) the position of the letter on that number (i.e., first, second, or third) is pressed. FIG. 10 shows a double digit entry to letter conversion table. Unfortunately, such a system requires two entries per letter.

In view of the above, a method and device for interpreting additional information from a sequence of signals, such as dual tone signals for example, is needed.

SUMMARY OF THE INVENTION

The present invention obviates the aforementioned problems by providing a method for decoding a sequence of signals to form decoded information. The method (a) determines information from an inherent property of each of the signals of the sequence, (b) determines additional information from a duration of one of the signals and/or an inter-signal pause between two of the signals, and (c) combines the information determined in step (a) and the additional information determined in step (b) to form the decoded information. Each of the signals may be a dual tone signal and the inherent property of each of the signals may be a high and low frequency pair of the dual tone signal. The sequence of signals may be an entered seven digit number.

A central office may use the method of the present invention to route a call based on the decoded information. The call may be routed to a person's telephone, facsimile, pager, e-mail, voice mail, etc.

The step of determining additional information may be based on a duration of each of at least two, at least three, at least four, at least five, at least six, or all of the signals. Alternatively, the step of determining additional information may be based on durations of inter-signal pauses between three of the signals, four of the signals, or each of the signals.

The present invention also provides a device for decoding a sequence of signals to form decoded information. The device includes (a) a first unit that determines information from an inherent property of each of the signals of the sequence, (b) a second unit that determines additional information from a duration of one of the signals and/or an inter-signal pause between two of the signals, and (c) a combiner that combines the information determined by the first unit and the additional information determined by the second unit to form the decoded information. The first unit may be a dual tone multiple frequency decoder. The second unit may include a timer for determining the duration, and a duration-to-state translator that determines the additional information from the duration.

The method may also be used to decode a signal to form decoded information by (a) determining information from an inherent property of the signal, (b) determining additional information from a duration of the signal, and (c) combining the information determined in step (a) and the additional information determined in step (b) to form the decoded information.

BRIEF DESCRIPTION OF THE DRAWINGS

For a better understanding of the invention, reference is made to the following description of an exemplary embodiment thereof, and to the accompanying drawings, wherein:

FIGS. 3*a* through 3*d* depict a flow diagram which illustrates steps involved with initiating a call, processing the call, and terminating the call, in a system using "in-band" signaling;

FIG. 5 is a table showing the low and high frequency pairs used to represent digits with dual tone signals;

FIG. 7 is a table which compares the information which may be conveyed when one or more of the up to a sequence of seven (7) digits represents three (3) states in accordance with the present invention, with conventional dual tone multiple frequency (DTMF) receivers;

FIG. 8 is a table which compares the information which may be conveyed when one or more of the up to a sequence of seven (7) digits represents two (2) states in accordance with the present invention, with conventional dual tone multiple frequency (DTMF) receivers;

FIG. 10 is a double digit entry to letter conversion table used to decode letters "typed" on a telephone keypad; and FIG. 11 is an ASCII conversion chart.

DETAILED DESCRIPTION

Figure 1:
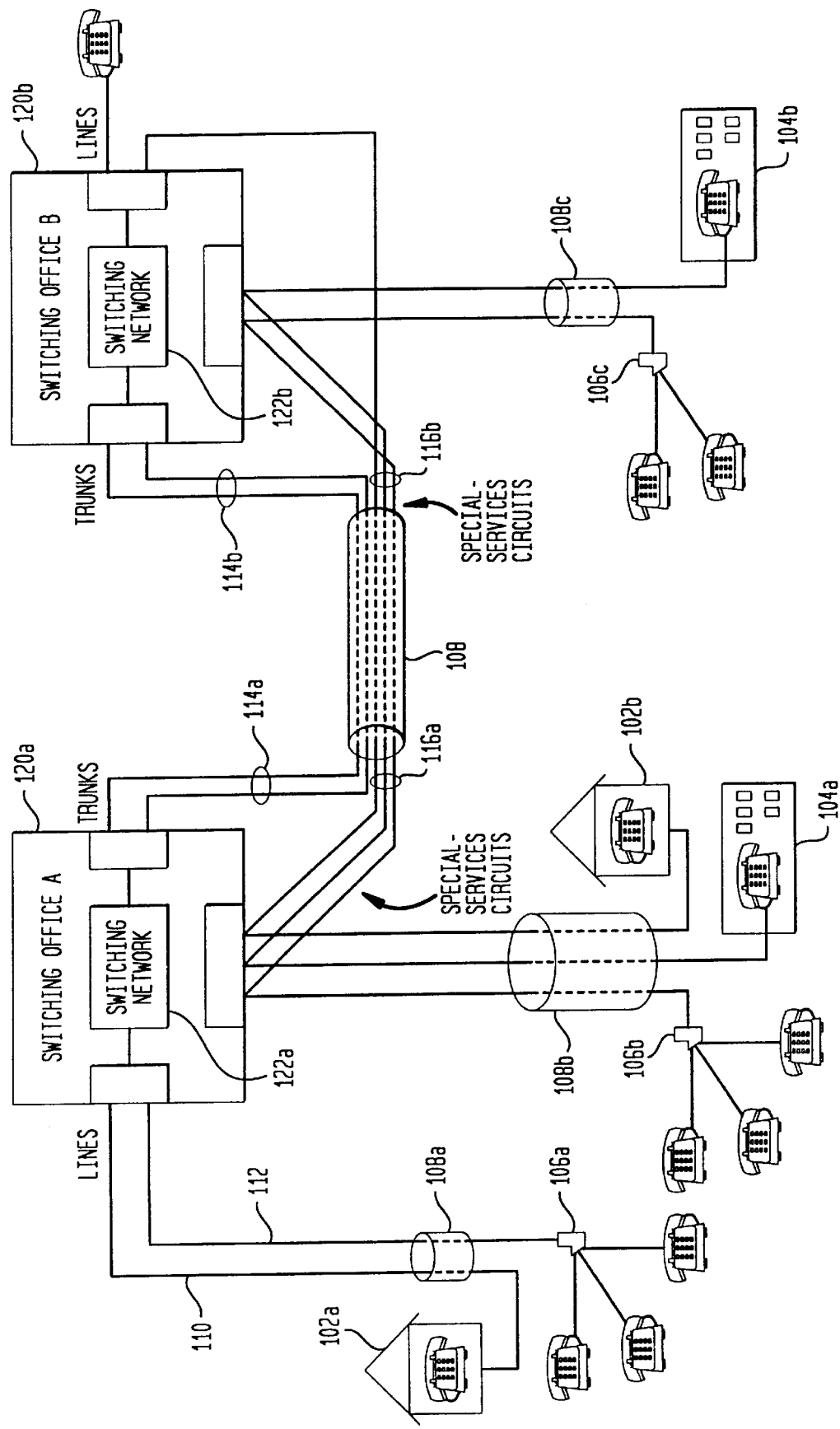
FIG. 1 illustrates the use of transmission facilities by various types of services.
Figure 2:
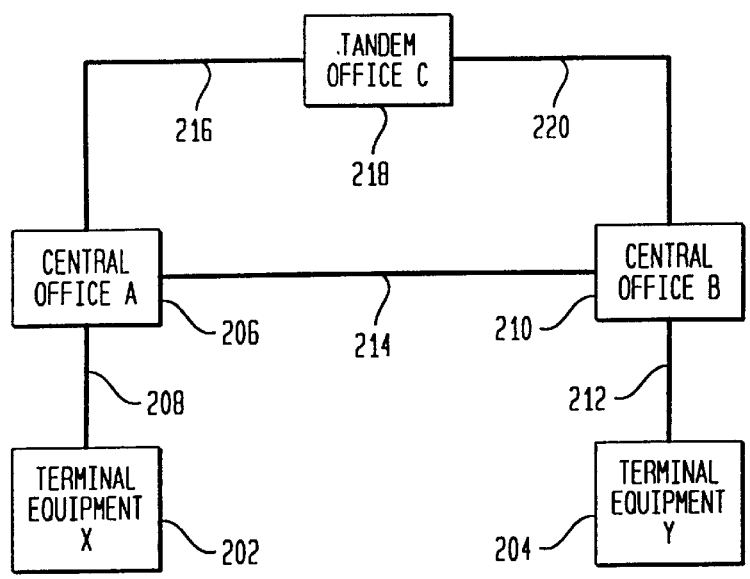
FIG. 2 is a block diagram showing the connection of two pieces of terminal equipment at customer premises served by separate central offices.
Figure 3A:
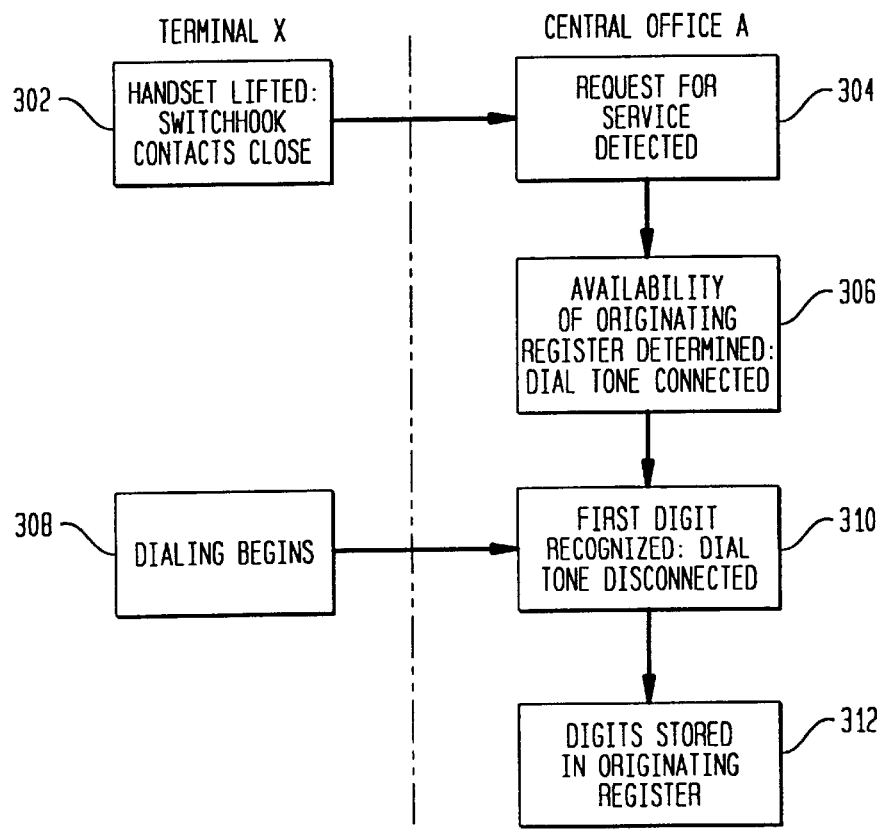
Figure 3B:
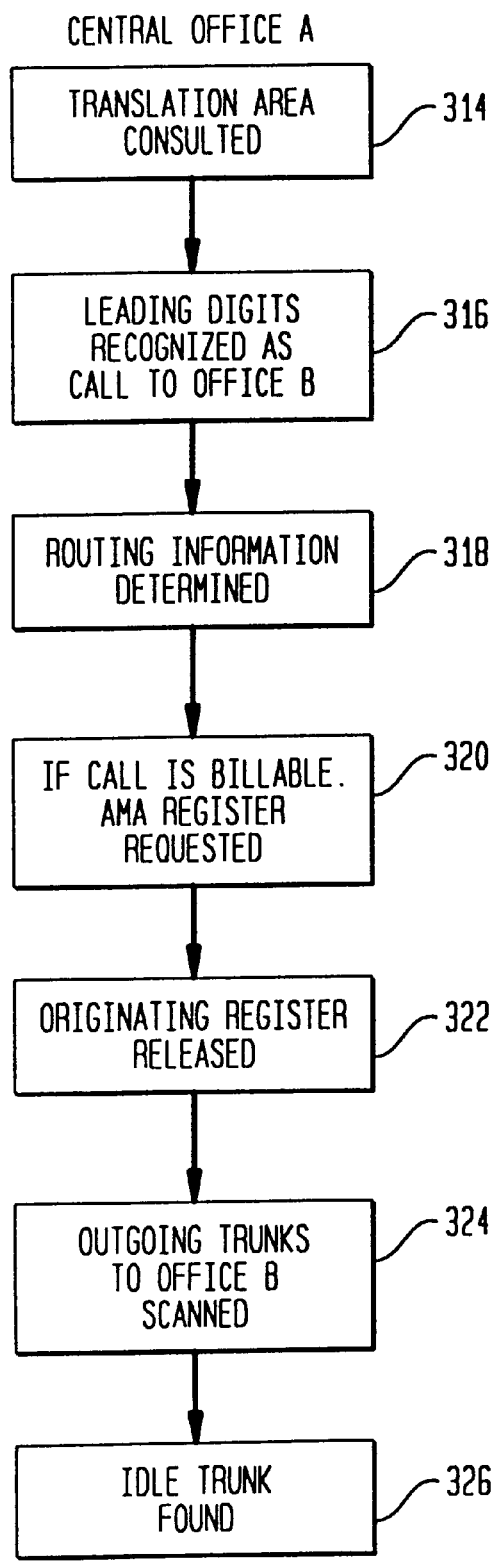
Figure 3D:
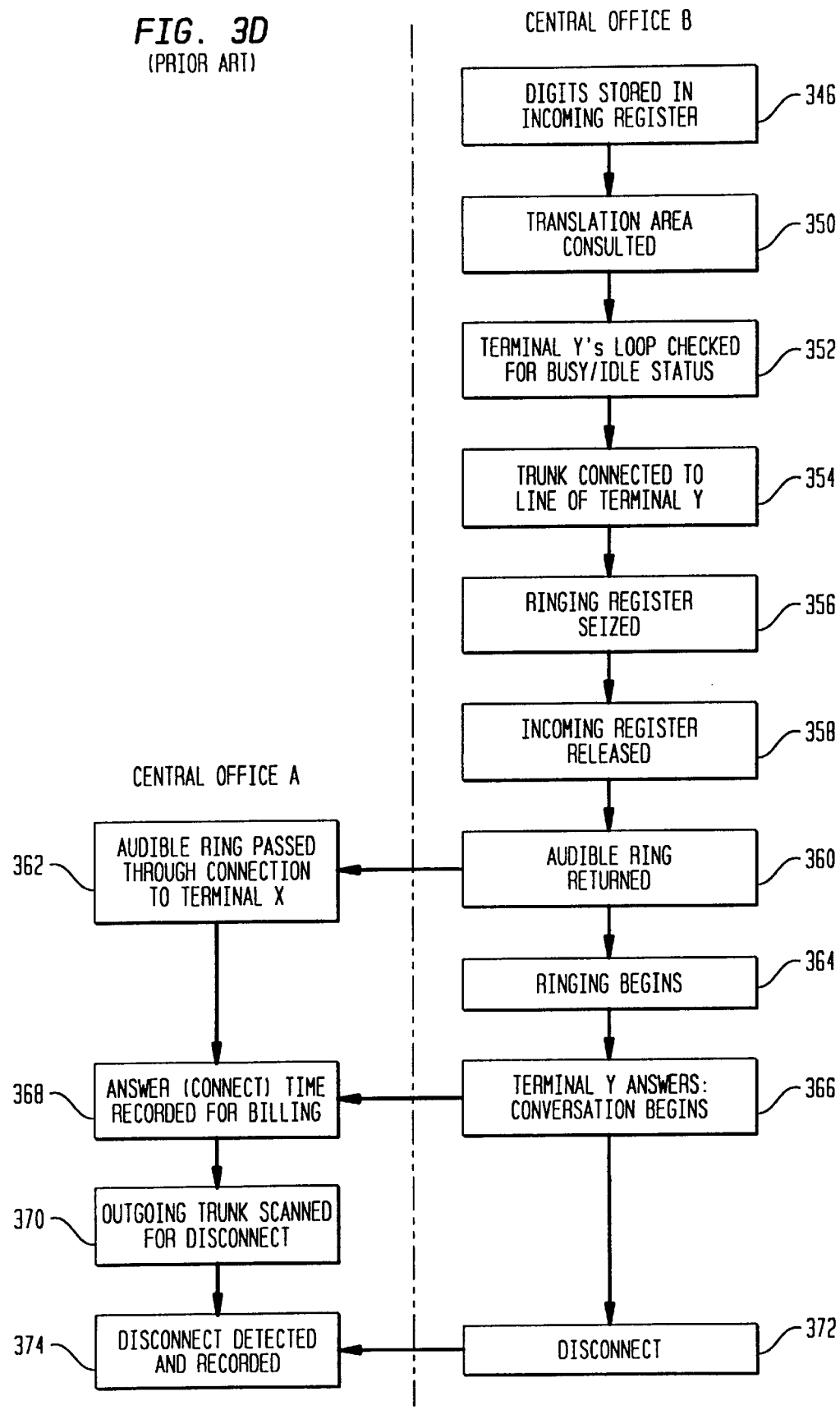
Figure 4:
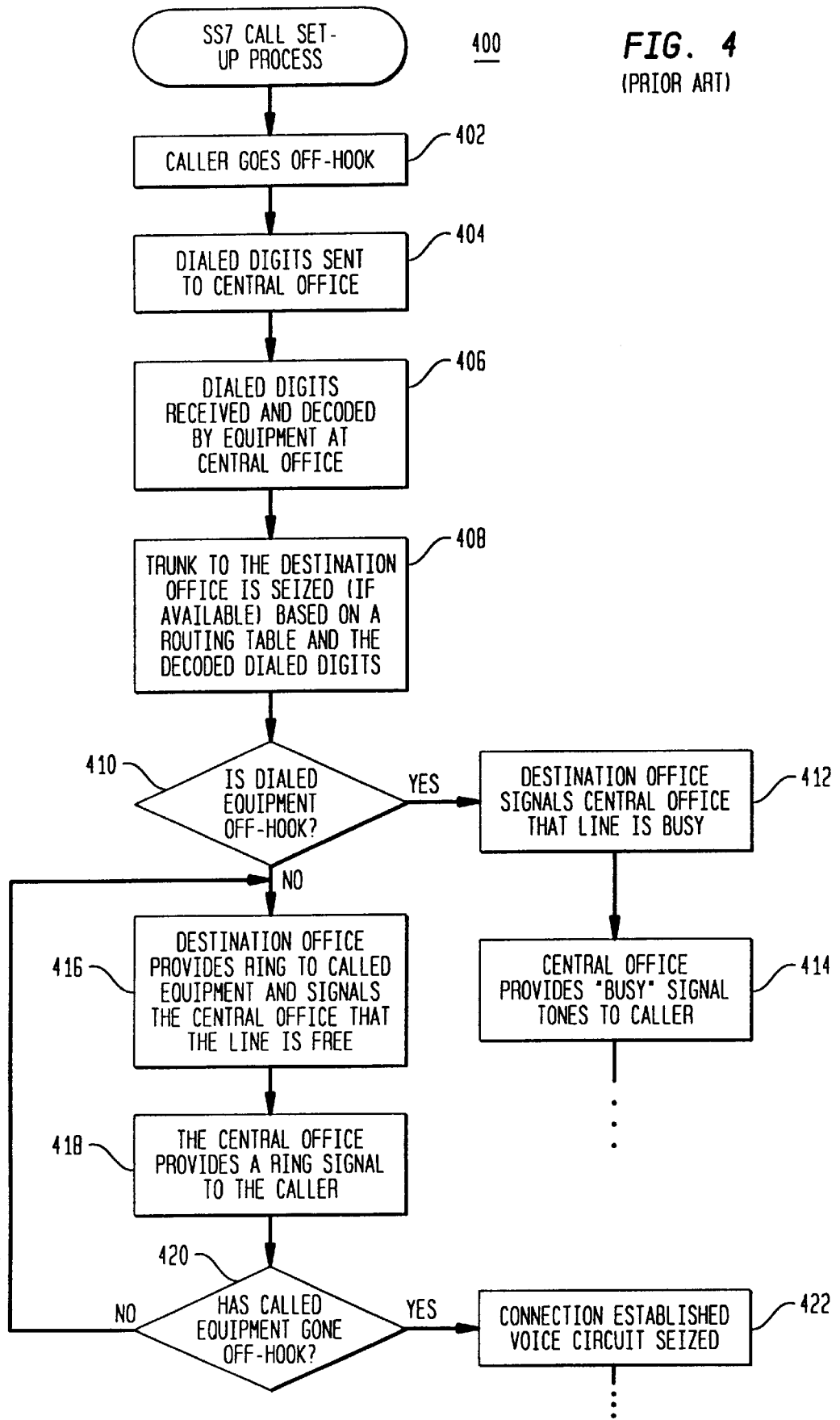
FIG. 4 is a flow diagram which illustrates the steps involved in setting up a call in a system using "out-of-band" signaling such as SS7.
Figure 6:
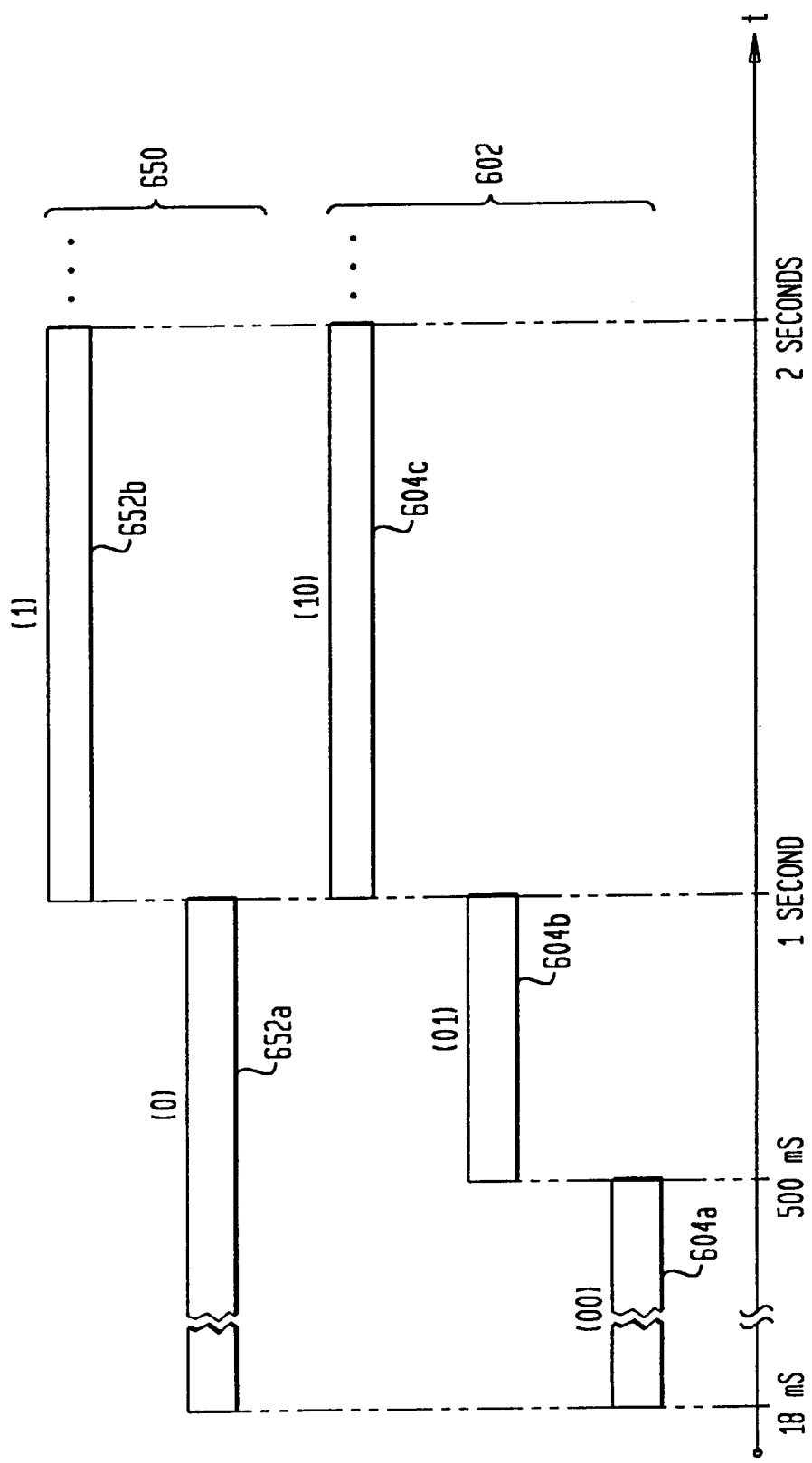
FIG. 6 illustrates two examples of using signal duration to infer information.

The present invention interprets the duration of, and/or the duration of the pause between, signals, such as dual tone signals, as additional information. FIG. 6 illustrates two (2) examples of how the duration of the dual tones may be interpreted as additional information. In conventional telephone DTMF receivers, a given tone pair represents a given digit—nothing more. For example, as shown in FIG. 5, 770 Hz and 1336 Hz dual tone is interpreted as representing the digit "5". FIG. 6 is a timing diagram which illustrates how a given dual tone signal can be interpreted differently depending on its duration.

As shown in FIG. 6, a first grouping of tone durations 602 exemplifies how a given tone pair (e.g., 770 Hz and 1336 Hz) can represent one of three possible states based on its duration. As shown in FIG. 6, under the example illustrated in group 602, if the tone pair 604*a* has a duration of between 18 ms and 500 ms, it represents a first state. The detection device of the present invention may generate a bit pair (e.g., 00) in addition to the information derived from the tone frequencies and shown in FIG. 5. If the tone pair 604*b* has a duration of more than 500 ms and up to one (1) second, it represents a second state and the device of the present invention may generate a bit pair (e.g., 01) in addition to the information derived from the tone frequencies. Finally, if the tone pair 604*c* has a duration of more than one second, it represents a third state and the device of the present invention may generate a bit pair (e.g., 10) in addition to the information derived from the tone frequencies.

FIG. 7 is a table which compares the information which may be conveyed when one or more of a sequence of seven (7) digits represents three states in accordance with the present invention, with conventional dual tone multiple frequency (DTMF) receivers. As shown, in a conventional system, a sequence of (7) digits, each having one of ten (10) possible states (based on the low and high frequency pair) has 10,000,000 (or $107^7$) possible states. As FIG. 7 shows, this number of possible states is tripled for every digit of the seven (7) digits that have 30 possible states (based on the low and high frequency pair and based on the duration of the paired frequencies).

A second grouping of tone durations 650 exemplifies how a given tone pair (e.g., 770 Hz and 1336 Hz) can represent one of two possible states based on its duration. As shown in FIG. 6, under the example illustrated in group 650, if the tone pair 652*a* has a duration of between 18 ms and one (1) second, it represents a first state. The device of the present invention may generate a bit (e.g., 0) in addition to the information derived from the tone frequencies. If the tone pair 652*b* has a duration of more than one (1) second, it represents second state and the device of the present invention may generate a bit (e.g., 1) in addition to the information derived from the tone frequencies.

FIG. 8 is a table which compares the information which may be conveyed when one or more of the sequence of seven (7) digits represents two (2) states in accordance with the present invention, with conventional dual tone multiple frequency (DTMF) receivers. As shown, in a conventional system, a sequence of (7) digits, each having one of ten (10) possible states (based on the low and high frequency pair) has 10,000,000 (or $10^7$) possible states. As FIG. 8 shows, this number of possible states is doubled for every digit of the seven (7) digits that have 20 possible states (based on the low and high frequency pair and based on the duration of the paired frequencies).

As will be apparent to those skilled in the art, the selection of states from among a number of duration ranges may vary. However, human factors, such as the ability of people to accurately and precisely predict time ranges should be considered when determining which durational ranges will represent which states and the number of states used.

The duration of pauses between pressing digits may also be used to convey information in a similar manner. Again, human factors should be considered.

Figure 9:
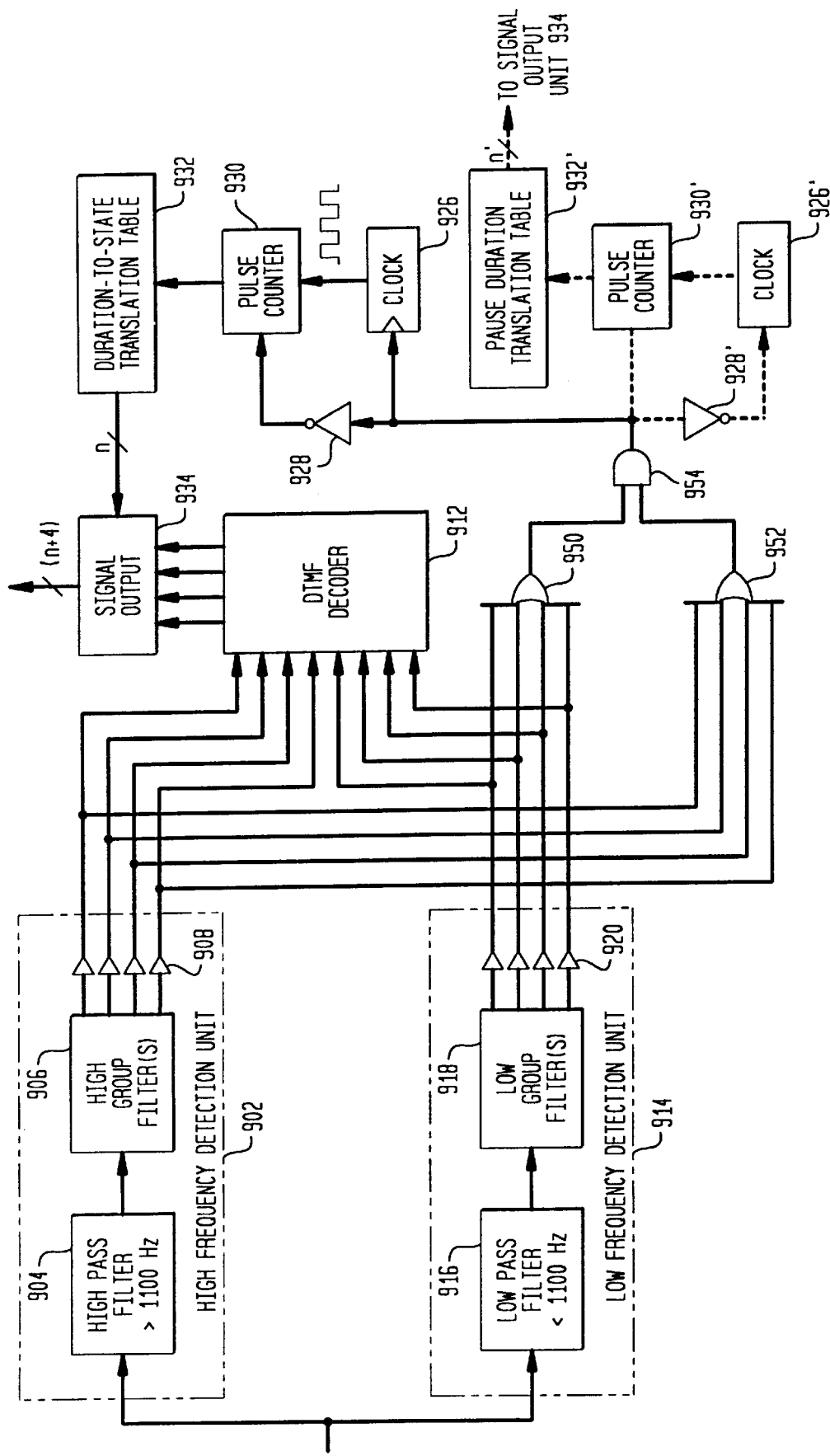
FIG. 9 is a block diagram of a decoder of the present invention.

FIG. 9 is a block schematic of an exemplary decoder of the present invention. As shown in FIG. 9, a high frequency detection unit 902 is used to detect the presence of the high frequencies listed in the table of FIG. 5 (i.e., 1209 Hz, 1336 Hz, 1477 Hz, and 1633 Hz) and a low frequency detection unit 914 is used to detect the presence of the low frequencies listed in the table of FIG. 5 (i.e., 697 Hz, 770 Hz, 852 Hz, and 941 Hz). The high and low pass filters 904 and 916, respectively, serve to split the band of the incoming frequencies. The outputs of high and low group filters 906 and 918, respectively, are provided, via comparitors 908 and 920, respectively, to a DTMF encoder 912. The DTMF encoder 912 provides a four (4) bit hexadecimal (or binary) output (see e.g., FIG. 5) based on the which two of its eight (8) inputs are high. Up to this point, the device of the present invention operates like a typical DTMF receiver.

The hexadecimal output is clocked and provided to signal output unit 934. In addition to being provided to the DTMF decoder 912, the outputs of the low group filter(s) 918 are provided, via comparitors 920, to a first OR gate 950 and the outputs of the high group filter(s) 906 are provided, via comparitors 908, to a second OR gate 952. The outputs of the first and second OR gates are provided to AND gate 954. The output of the AND gate 954 is provided to a clock output enable pin of a clock 926 and, via inverter 928, to the reset pin of a pulse counter 930. The pulse train from the clock 926 is provided to the pulse counter 930. Upon being reset, the output of the pulse counter 930 is provided to a duration-to-state translation table 932.

The duration-to-state table 932 converts the duration of the dual tones, i.e., the pulse count, to an n-bit output. That n-bit output is also provided to the signal output 934 which provides an (n+4)-bit output based on the four-bit output from the DTMF decoder 912 and on the n-bit output from the duration-to-state translation table 932. Thus, the duration of the dual tone signal is interpreted to provide additional information.

As is further shown in FIG. 9, inverter 928', clock 926', pulse counter 930', and pause duration-to-state translation table 932', may be used instead of, or in addition to, the aforementioned elements, for providing n'-bits of additional information based on the duration of an inter-dual tone pause.

If the duration-to-state and/or the pause duration-to-state translation table(s) provide an n=3-bit output, then the (n+4) or 7-bit output of the signal output unit 934 could be provided to an ASCII conversion table, not shown, to convert the 7-bit signal to an ASCII value. An ASCII conversion chart is shown in FIG. 11. The ASCII conversion table could be provided at the central office or at the premises of an end user.

An example of the operation of the device of the present invention will now be provided. In the following example, is assumed that a "5" is pressed by a telephone caller for less than one second. The dual tone sequence is provided to both the high and low frequency detection units 902 and 914, respectively. For the "5" digit, the high frequency detection unit 902 will detect a 1336 Hz frequency signal exceeding a threshold amplitude, and the low frequency detection unit 914 will detect a 770 Hz frequency signal exceeding the threshold amplitude. One (1) of the four (4) output lines of the high and low frequency detection units 902 and 914, respectively, corresponding to 1336 Hz and 770 Hz, will be HIGH and the other lines will be LOW.

Each of these signals output by the high and low frequency detection units 902 and 914, respectively, are provided to a DTMF decoder 912, the signals output by the high frequency detection unit 902 are also provided to the input of the first OR gate 952, and the signals output by the low frequency detection unit 914 are provided to the input of the second OR gate 950. The DTMF decoder 912 will output a four (4) bit hexadecimal number "0101", as shown in FIG. 5, which will be provided to a first input group of the signal output unit 934. Each of the first and second OR gates 952 and 950, respectively, will provide a HIGH output to the input of an AND gate 954. The AND gate will also provide a HIGH output to the enable pin of the clock 926 and, via inverter 928, to the reset pin of a pulse counter 930.

Since the duration of the dual frequency signal is less than one (1) second, the pulse counter 930 will only count the clock pulses during this time period, before it is reset. The output of the pulse counter 930 is provided to the duration-to-state translation table 932. In a scheme exemplified by the grouping 650 of FIG. 6, the duration-to-state translation table 932 provides a one (1) bit signal of "0" to another input of the signal output unit 934. In this example, the signal output unit 934 will concatenate and output the hexadecimal output of the DTMF decoder 912 and the n-bit signal from the duration-to-state translation table 932; namely 00101 (i.e., "0" from the duration-to-state translation table 932 concatenated with "0101" from the DTMF decoder) or 01010 (i.e., "0101" from the DTMF decoder concatenated with "0" from the duration-to-state translation table 932).

If, in the above example, the "5" was pressed for more than one (1) second, the duration-to-state translation table 932 would have provided a one (1) bit signal of "1" to the signal output unit 934. In this second example, the signal output unit 934 will concatenate and output the hexadecimal output of the DTMF decoder 912 and the n-bit signal from the duration-to-state translation table 932; namely 10101 (i.e., "1" from the duration-to-state translation table 932 concatenated with "0101" from the DTMF decoder) or 01011 (i.e., "0101" from the DTMF decoder concatenated with "1" from the duration-to-state translation table 932).

With the present invention, digits having duration and/or interdigit pause duration dependent information could be used by a central office to (a) route calls and/or (b) pass information, in the form of the concatenated output, to another central office or to an end user. Regarding the routing of calls by the central office, one telephone number with one or more digits of its sequence being interpreted to have duration dependent, or interdigit pause duration dependent, information, could, for example represent one person's telephone number, facsimile number, pager number, e-mail number, voice mail number, etc. The present invention may also permit enhanced security of a PIN (or personal identification number) having one or more digits being interpreted to have duration dependent, or interdigit pause duration dependent, information. The invention may also be used to conserve toll free numbers, or to avoid the need for area code changes.

The present invention is advantageous because it works with existing telephones or other dual tone generating equipment and existing telephone circuits. It merely requires that the DTMF receivers be replaced or other control equipment to be reprogrammed.

The embodiments described herein are merely illustrative of the principles of the present invention. Various modifications may be made thereto by persons ordinarily skilled in the art, without departing from the scope or spirit of the invention.

What is claimed is:

1. A method for distinguising among a plurality of devices on a network or among a plurality of data elements, comprising the steps of:
    assigning a sequence of two or more signals to a device or data element, where each signal in the sequence has a frequency, and
    at least one signal has a specific duration; or
    the sequence has a time-specific pause between at least two adjacent signals; or
    at least one signal has a specific duration and the sequence has a time-specific pause between at least two adjacent signals;
    receiving one of the assigned sequences of signals;
    detecting the frequency and duration of the signals in the received sequence and time-specific pauses between adjacent signals in the sequence; and
    in response to the step of detecting, identifying the device or data element corresponding to the received sequence of signals.

2. A method as set forth in claim 1 where the signals are DTMF.

3. A system for distinguishing among a plurality of devices on a network or among a plurality of data elements, comprising:
    means for assigning a sequence of two or more signals to a device or data element, where each signal in the sequence has a frequency, and
    at least one signal has a specific duration; or
    the sequence has a time-specific pause between at least two adjacent signals; or
    at least one signal has a specific duration and the sequence has a time-specific pause between at least two adjacent signals;
    means for receiving one of the assigned sequences of signals;
    means for detecting the frequency and duration of the signals in the received sequence and time-specific pauses between adjacent signals in the sequence; and
    means, responsive to the means for detecting, for identifying the device or data element corresponding to the received sequence of signals.

4. A system as set forth in claim 3 where the signals are DTMF.

* * * * *